United States Patent
Wang et al.

(10) Patent No.: US 9,543,860 B2
(45) Date of Patent: Jan. 10, 2017

(54) TRIBOELECTRIC NANOGENERATOR

(71) Applicants: Zhong Lin Wang, Marietta, GA (US); Guang Zhu, Atlanta, GA (US); Quingshen Jing, Atlanta, GA (US)

(72) Inventors: Zhong Lin Wang, Marietta, GA (US); Guang Zhu, Atlanta, GA (US); Quingshen Jing, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 41 days.

(21) Appl. No.: 14/818,982

(22) Filed: Aug. 5, 2015

(65) Prior Publication Data

US 2016/0065091 A1 Mar. 3, 2016

Related U.S. Application Data

(63) Continuation-in-part of application No. 14/189,656, filed on Feb. 25, 2014.

(60) Provisional application No. 61/771,371, filed on Mar. 1, 2013, provisional application No. 62/033,206, filed on Aug. 5, 2014.

(51) Int. Cl.
*H02N 1/04* (2006.01)

(52) U.S. Cl.
CPC ..................... *H02N 1/04* (2013.01)

(58) Field of Classification Search
CPC ........................... H02N 1/00–1/012
USPC ......... 310/300, 309, 310; 200/181; 322/2 A; 318/116
See application file for complete search history.

(56) References Cited

U.S. PATENT DOCUMENTS

| | | | |
|---|---|---|---|
| 4,126,822 A | 11/1978 | Wahlstrom | |
| 4,595,852 A * | 6/1986 | Gundlach | H02N 1/08 310/309 |
| 4,990,813 A * | 2/1991 | Paramo | H02N 1/04 310/308 |

(Continued)

OTHER PUBLICATIONS

ISA: "Notification of Transmittal of the International Search Report and the Written Opinion of the International Searching Authority, or the Declaration"; WIPO Feb. 22, 2013.

(Continued)

*Primary Examiner* — Thomas Truong
(74) *Attorney, Agent, or Firm* — Bryan W. Bockhop; Bockhop Intellectual Property Law, LLC

(57) ABSTRACT

A generator includes a first cylindrical member and a second cylindrical member. The first cylindrical member includes a first dielectric layer including a first material that has a first rating on a triboelectric series; and a first conductive strip disposed around an exterior surfaces of the first cylindrical member. The first conductive strip includes a second material that has a second rating on the triboelectric series that is different from the first rating. The second cylindrical member is disposed about the first cylindrical member and includes a second dielectric layer that includes the first material. The second cylindrical member also includes the second material and at least one second conductive strip disposed around an interior surface of the second cylindrical member. A sliding mechanism causes lateral relative motion between the first cylindrical member against the second cylindrical member, generating an electric potential imbalance between the first and second conductive strip.

11 Claims, 6 Drawing Sheets

(56) References Cited

U.S. PATENT DOCUMENTS

2004/0016120 A1* 1/2004 Boland .................. H02N 1/08
   29/886
2006/0064826 A1   3/2006 Kimball
2010/0133006 A1   6/2010 Shakra et al.
2011/0050181 A1   3/2011 Post et al.

OTHER PUBLICATIONS

Zhu, Guang: "Triboelectric-Generator-Driven Pulse Electrodeposition for Micropatterning"; Nano Letters, Aug. 13, 2012; ACS.

Notification of Related Application: U.S. Appl. No. 13/598,132, filed Aug. 29, 2012 by Wang et al. and commonly owned by the assignee of the present application includes subject matter related to the present application.

Notification of Related Application: U.S. Appl. No. 14/032,864, filed Sep. 20, 2013 by Wang et al. and commonly owned by the assignee of the present application includes subject matter related to the present application.

* cited by examiner

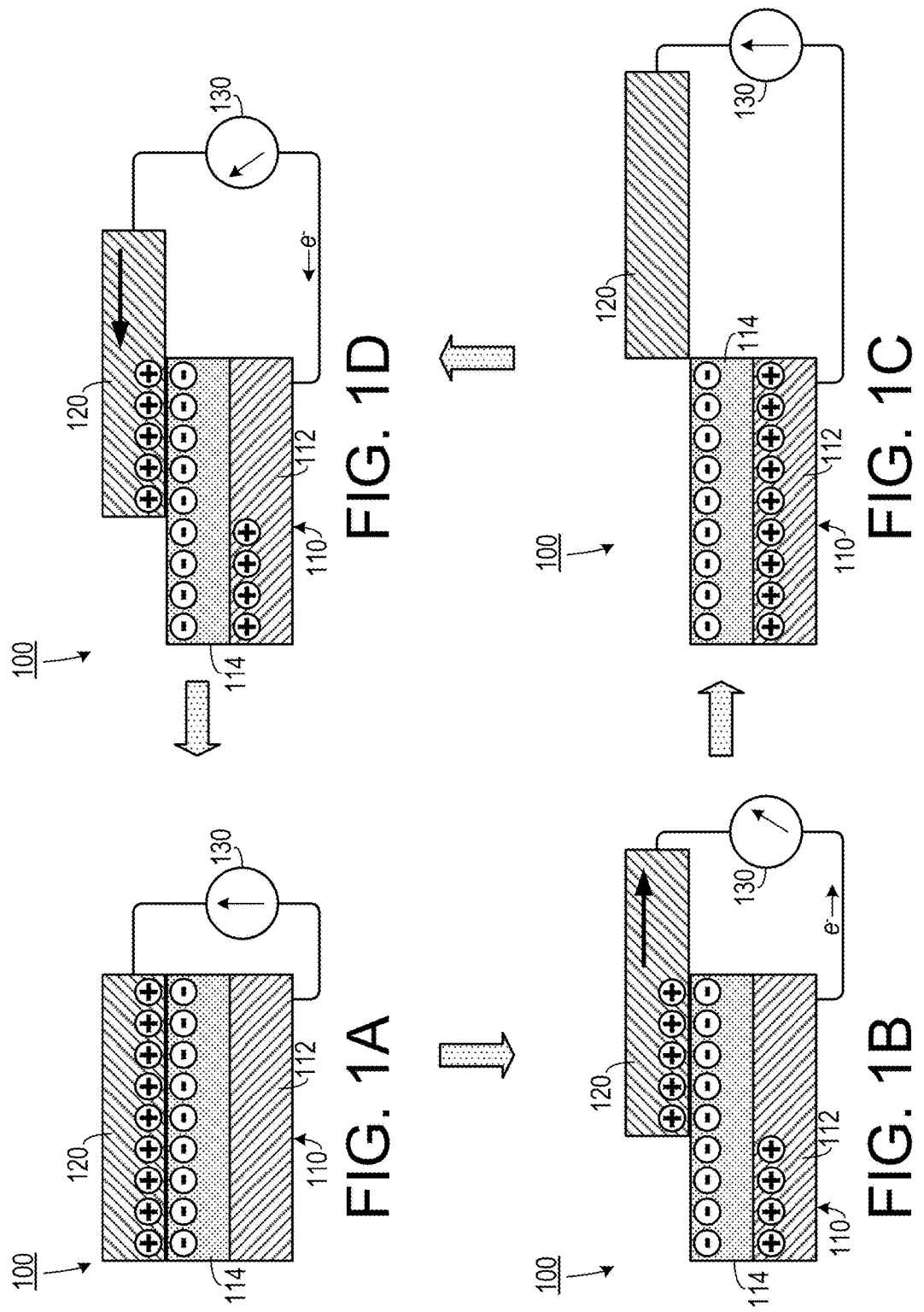

TRIBOELECTRIC NANOGENERATOR

CROSS-REFERENCE TO RELATED APPLICATION(S)

This application is a continuation-in-part of U.S. patent application Ser. No. 14/189,656, filed Feb. 25, 2014, which claims the benefit of U.S. Provisional Patent Application Ser. No. 61/771,371, filed Mar. 1, 2013, the entirety of each of which is hereby incorporated herein by reference.

STATEMENT OF GOVERNMENT INTEREST

This invention was made with government support under agreement No. DE-FG02-07ER46394, awarded by the Department of Energy. The government has certain rights in the invention.

BACKGROUND OF THE INVENTION

1. Field of the Invention

The present invention relates to generators and, more specifically, to a system for generating voltage and current using the triboelectric effect.

2. Description of the Related Art

Energy harvesting by converting ambient energy into electricity may offset the reliance of small portable electronics on traditional power supplies, such as batteries. When long-term operation of a large number of electronic devices in dispersed locations is required, energy harvesting has the advantages of outstanding longevity, relatively little maintenance, minimal disposal and contamination.

When two materials, at least one of which is non-conducting, come into contact with each other, a chemical bond, known as adhesion, is formed between the two materials. Depending on the triboelectric properties of the materials, one material may "capture" some of the electrons from the other material. If the two materials are separated from each other, a charge imbalance will occur. The material that captured the electron will negatively charged and the material that lost an electron will be positively charged. This charge imbalance gives rise to what is sometimes referred to as "static electricity." The term "static" in this case is somewhat deceptive, as it implies a lack of motion when in reality motion is necessary for charge imbalances to flow. The spark one feels upon touching a door knob is an example of such flow.

The triboelectric effect is a type of contact electrification in which certain materials become electrically charged after they come into contact with another such as through friction. It is the mechanism though which static electricity is generated. The triboelectric effects associated electrostatic phenomena are the most common electrical phenomena in daily life, from walking to driving. However, the triboelectric effect has been largely ignored as an energy source for electricity. Some electrostatic micro-generators have been developed and used in research relating to micro-electromechanical systems (MEMS), but such designs rely on an extra voltage source to charge electrode plates instead of harnessing triboelectric effect, leading to complicated structures and fabrication processes.

Previously demonstrated triboelectric generators require periodic contact and vertical separation of two materials that have opposite triboelectric polarities, making it only applicable to harvest energy from intermittent impact or shock. Such systems typically include a cavity with a constantly changing volume, which makes packaging difficult and limits applications in atmospheres with high humidity, corrosive chemicals or gases, and in water or other liquids.

Mechanisms using piezoelectric, electrostatic or electromagnetic principles to harvest energy from random vibrations, wind flow, air pressure, or human body motions have been developed and applied as generators or self-powered sensors. Recently, the development of triboelectric nanogenerators (TENGs) offers a new paradigm for fabricating high-output and cost effective generators for driving small electronics. Reciprocating motion is a very common mechanical motion occurs in natural oscillations, motion of waves, swing of human limbs, and mechanical piston movements, etc. Features of these motions that include long reciprocating distance, low frequencies and amplitude or frequency fluctuations pose challenges for previously developed vibration-harvesters, which were only suited to low-amplitude and high-frequency excitations induced by inertia forces.

Therefore, there is a need for a reliable, small and easily manufactured system for harvesting triboelectric energy from reciprocating motion.

SUMMARY OF THE INVENTION

The disadvantages of the prior art are overcome by the present invention which, in one aspect, is a generator that includes a first member, a second member and a sliding mechanism. The first member includes a first electrode and a first dielectric layer affixed to the first electrode. The first dielectric layer includes a first material that has a first rating on a triboelectric series. The second member includes a second material that has a second rating on the triboelectric series that is different from the first rating. The second member includes a second electrode. The second member is disposed adjacent to the first dielectric layer so that the first dielectric layer is disposed between the first electrode and the second electrode. The sliding mechanism is configured to move the first member laterally against the second member in a first direction, thereby generating an electric potential imbalance between the first electrode and the second electrode.

In another aspect, the invention is a method of generating electricity, in which a first member is placed against a second member. The first member includes: a first electrode and a first dielectric layer affixed to the first electrode the first dielectric layer including a first material that has a first rating on a triboelectric series. The second member includes a second material that has a second rating on the triboelectric series that is different from the first rating. The second member also includes a second electrode. The second member is disposed adjacent to the first dielectric layer so that the first dielectric layer is disposed between the first electrode and the second electrode. The first member is slid laterally against the second member along a first direction so that when at least a portion of the first member has slid apart from at least a portion of the second member, an electric potential imbalance occurs between the first electrode and the second electrode.

In yet another aspect, the invention is a generator that includes a first cylindrical member and a second cylindrical member. The first cylindrical member includes a first dielectric layer including a first material that has a first rating on a triboelectric series; and at least one first conductive strip disposed around an exterior surfaces of the first cylindrical member. The first conductive strip includes a second material that has a second rating on the triboelectric series that is different from the first rating. The second cylindrical member is disposed about the first cylindrical member and includes a second dielectric layer that includes the first material. The second cylindrical member also includes at least one second conductive strip disposed around an exterior surface of the second cylindrical member. The second conductive strip includes the second material. A sliding mechanism is configured to cause lateral relative motion between the first cylindrical member against the second cylindrical member, thereby generating an electric potential imbalance between the first conductive strip and the second conductive strip.

In another aspect the first conductive strip is disposed on an interior surface of the first cylindrical member and the second conductive strip is disposed on an interior surface of the second cylindrical member.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-1D are a series of schematic diagrams one embodiment of a triboelectric generator.

DETAILED DESCRIPTION OF THE INVENTION

Figure 2A:
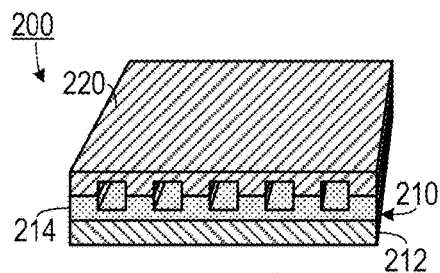
FIG. 2A is a perspective view of an embodiment of a grooved triboelectric generator.
Figure 2B:
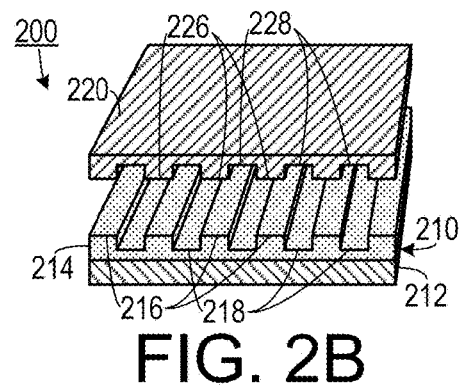
FIG. 2B is a perspective view of an embodiment of a grooved triboelectric generator in which the first member is separated from the second member.
Figure 3A:
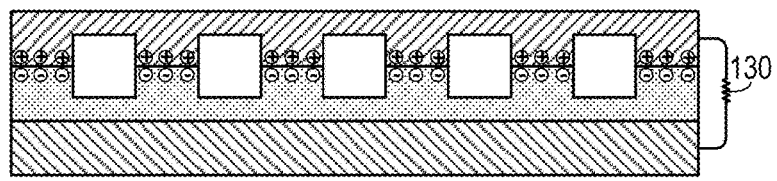
FIGS. 3A-3D are a series of schematic diagrams showing electric generation using the embodiment shown in FIG. 2A.
Figure 3B:
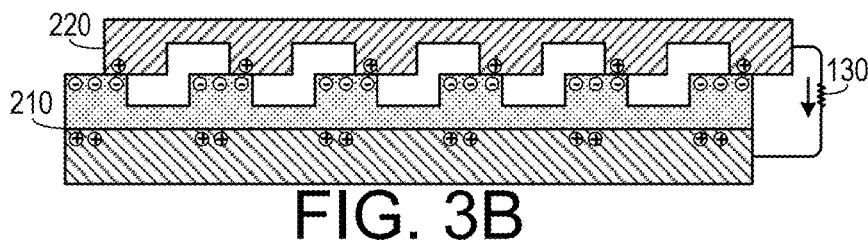
Figure 3C:
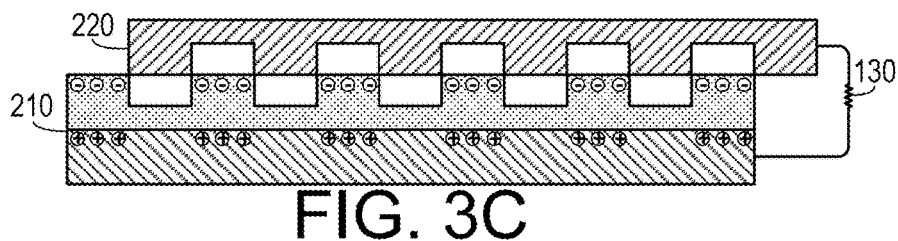
Figure 3D:
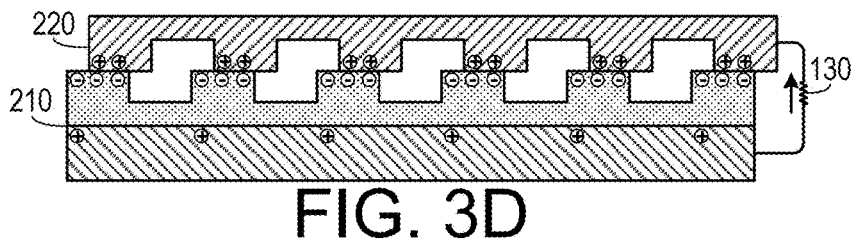

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Related U.S. patent application Ser. No. 13/598,132, filed on Aug. 29, 2012 by Wang et al. and Ser. No. 14/032,864, filed on Sep. 20, 2013 by Wang et al. disclose methods of making triboelectric generators and components thereof and are both incorporated herein by reference for the purpose of disclosing such methods.

The present invention includes a triboelectric nanogenerator (TENG) that converts small-scale mechanical energy into electricity by sliding two surfaces laterally against each other. The principle of the TENG is based on sliding electrification between two surfaces, which expands the applicability of the TENG for diverse forms of mechanical motions.

As shown in FIGS. 1A-1D, a basic sliding embodiment of a TENG 100 includes a first member 110 disposed oppositely from a second member 120. The first member 120 includes a first electrode 112 and a first dielectric layer 114 coupled thereto. The second member 120 can serve as both a contact surface and an electrode. In one embodiment, the second member 120 can simply include a layer of aluminum (or other conductive material that is at a different position on a triboelectric series that the first dielectric layer 114), the first dielectric layer 114 can include a PTFE film and the first electrode 112 can include a metal, such as copper. The first electrode 112 may be coupled to the second electrode 120 through a load 130. (While not shown in FIGS. 1A-1D for the sake of simplicity, both the first member 110 and the second member 120 may each be mounted on a suitable substrate, such as an acrylic plate.) The first member and the second member do not have to be planar. They can be curved surfaces as long as they are parallel and have conformal contact with each other.

When the first dielectric layer 114 is placed against the second member 120, as shown in FIG. 1A, the triboelectric effect causes electrons to be transferred from the second member 120 to the first dielectric layer 114, thereby causing a net negative charge in the first dielectric layer 114 and a net positive charge in the second member 120. As the first member 110 is in contact with the second member 120 over their entire surfaces, the charges are balanced out. However, when a lateral force is applied to the second member 120 causing it to slide away from the first member 110, as shown in FIG. 1B, then the extra electrons in the first dielectric layer 114 stay in place due to the charge immobility associated with a dielectric while positive charges in the second member 120 move away from the first dielectric layer 114, causing a potential imbalance between the first member 110 and the second member 120. This then causes electrons to flow from the first electrode 112 through the load 130 to the second member 120. When the second member 120 is slid at its maximum offset from the first member 110, as shown in FIG. 1C, all of the negative charges held by the first dielectric layer 114 are balanced with corresponding positive charges in the first electrode 112 while the second member 120 is electrically neutral.

When the second member 120 is slid back over the first member 110, as shown in FIG. 1D, electrons flow back from the first electrode 112 through the load 130 into the second member 120, thereby more closely balancing the charges with the first dielectric layer 114. This causes a current to flow through the load 130 in an opposite direction from the direction it flowed during the motion shown in FIG. 1B. Once the second member 120 returns to the position shown in FIG. 1A, the charges are again balanced between the first dielectric layer 114 and the second member 120. (The same would hold true if the first member 110 is slid over the second member 120, or if both members are in motion so that there is relative sliding motion between the two members.)

The cycle shown in FIGS. 1A-1D can repeat itself, thereby generating an alternating current, if the TENG 100 is adapted with a sliding mechanism to receive force from a reciprocating motion source. The force can be directly applied, or it can be an inertial force due to acceleration. For example, the reciprocating motion source could be the repetitive footfalls of a person walking, or wave motion, or motion coming from a biological system—such as a heartbeat, or gusting wind, or one of many other types of repetitive motion.

One experimental embodiment of a TENG has a structure in which two contacting surfaces that can slide smoothly with one against the other. Acrylic was selected as a substrate material due to its decent strength, light weight and good machinability. On one substrate, aluminum thin film plays dual roles of an electrode and a sliding surface. On the other substrate, copper electrode is sandwiched between the substrate and a PTFE film. The PTFE film acts as another sliding surface. At its original position, the two sliding surfaces are fully aligned, with one sitting freely on the other. Driven by a tangential force applied to a substrate, relative displacement in contact mode occurs in lateral direction. After the two surfaces are fully displaced, the reciprocating force retraces them back to the aligned position.

The principle of the TENG is explained by the coupling between triboelectric effect and electrostatic effect. Once the PTFE film is brought into contact with the aluminum thin film, surface charge transfer takes place due to the triboelectric effect or contact electrification. Since PTFE is much more triboelectrically negative than aluminum, electrons are injected from aluminum into PTFE. At the aligned position, though triboelectric charges present on the surfaces, positive ones on aluminum are fully compensated by the negative ones on PTFE, producing no electric field in the surrounding space if the electric field at the edge is ignored. Once a relative displacement is introduced by an externally applied force in the direction parallel to the surfaces, triboelectric charges are not compensated at the displaced/mismatched areas, resulting in the creation of an effective dipole polarization parallel to the direction of the displacement. Therefore, the uncompensated charges generate electric potential difference (EDP) across the two electrodes. If the electric potential of the copper electrode is set to be zero, the EDP can be analytically expressed as a function of the displacement under simplified approximations.

$$EPD = U_{Al} - U_{Cu} \quad (1)$$
$$= \frac{q}{2\pi\varepsilon_0 WL}\int_0^l \tan^{-1}\left(\frac{l}{t}\right) dt$$
$$= \frac{q}{2\pi\varepsilon_0 WL}\left[\frac{l}{2}\ln(t^2+l^2) + t\tan^{-1}\left(\frac{l}{t}\right)\right]$$

where l is the mismatched displacement between the two sliding plates, q is the quantity of the triboelectric charges on one plate, $\varepsilon_0$ is the vacuum permittivity, L is the length of the TENG's plate, W is the width of the TENG, and t is the thickness of the PTFE film.

If the two electrodes are electrically connected, once displacement is established, the uncompensated negative triboelectric charges on PTFE will repulsively drive free electrons on the copper electrode to the aluminum electrode, neutralizing the positive triboelectric charges and leaving behind positive induced charges. The flow of induced electrons lasts until the displacement reaches the maximum. Based on assumptions made in the analytical model, the induced charges equal the triboelectric charges in quantity. Therefore, at fully displaced position, the positive triboelectric charges are completely balanced out by induced electrons, indicating no more current flow. As the displacement is diminished by the reciprocating force, the induced electrons flow back to the copper electrode until the fully aligned position is restored. Therefore, in the entire process, alternating current (AC) is produced through the external load.

To characterize the performance of an TENG with a plate size of 6.4 cm by 3.8 cm, the short-circuit current ($I_{sc}$) and open-circuit voltage ($V_{oc}$) were measured at an average sliding velocity of 0.6 m/s introduced by a linear motor. It was found that the $I_{sc}$ exhibits peaks of alternating directions. Increasing displacement gives a positive current peak, while shrinking displacement leads to a negative one. No electric current is produced at either aligned or entirely displaced position. The $V_{oc}$ switches between zero and a maximum value, which corresponds to the aligned and fully displaced positions, respectively. Enabled by a full-wave diode bridge, the AC electric output can be rectified to a DC signal. With a diode bridge, the total accumulative induced charges, independent of sliding direction, can be added up. In this embodiment, 3very step represents an output current resulting from a one-way sliding motion, generating 0.6 μC of induced charges on average. Correspondingly, the area density of the triboelectric charges is calculated to be 257 μC/m².

In an experimental embodiment of such a dielectric-dielectric system, the sliding-triboelectric nanogenerator includes two plates (71 mm×50 mm) with glass slides as the supporting substrates to ensure the surface flatness. Polyamide 6,6 (Nylon) and polytetrafluoroethylene (PTFE) films, the two polymers at the opposite ends of the triboelectric series, are chosen as the triboelectric layers adhered on surfaces of the glass slides for effective electrification during sliding. On each polymer film, a layer of metal electrode was deposited on the side next to the glass slide (named as top electrode for the one on Nylon and bottom electrode for the one on PTFE). The two plates are kept in parallel to each other and the polymeric surfaces are in intimate contact. As driven by the mechanical motion/vibration along the long-edge of the plate, the two plates slide against each other, with the contact area changing periodically. In order to enhance the triboelectric charge density on the surface, the PTFE film was dry-etched using inductive coupled plasma (ICP) to create aligned nanowire-structures, which increase the surface roughness and the effective surface area. The PTFE surface is uniformly covered with nanowire-structures, with an average length of ~1.5 μm. The PTFE-covered plate was bonded to a stationary stage, while the Nylon side was fastened to a parallel flat-end rail guide, which was connected to a linear motor for inducing an in-plane sliding motion.

In this embodiment, the triboelectrification will leave the Nylon surface with net positive charges and the PTFE with net negative charges with equal density. Since the tribocharges on the insulators will only distribute in the surface layer and will not be leaked out for an extended period of time, the separation between the positively-charged surface and negatively-charged surface is negligible at this overlapping position, and thus there will be little electric potential drop across the two electrodes. Once the top plate with the positively-charged surface starts to slide outward, the in-plane charge separation is initiated due to the decrease in contact surface area. The separated charges will generate an electric field pointing from the right to the left almost parallel to the plates, inducing a higher potential at the top electrode. This potential difference will drive a current flow from the top electrode to the bottom electrode in order to generate an electric potential drop that cancels the tribo-charge-induced potential. Because the vertical distance between the electrode layer and the tribo-charged polymeric surface is negligible compared to the lateral charge separation distance, the amount of the transferred charges on the electrodes approximately equals the amount of the separated charges at any sliding displacement. Thus, the current flow will continue with the continuation of the on-going sliding process that keeps increasing the separated charges, until the top plate fully slides out of the bottom plate and the tribo-charged surfaces are entirely separated.

Subsequently, when the top plate is reverted to slide backwards, the separated charges begin to get in contact again but no annihilation due to the insulator nature of the polymer materials. The redundant transferred charges on the electrodes will flow back through the external load with the increase of the contact area, in order to keep the electrostatic equilibrium. This will contribute to a current flow from the bottom electrode to the top electrode, along with the second half cycle of sliding. Once the two plates reach the overlapping position, the charged surfaces get into fully contact again. There will be no transferred charges left on the electrode, and the device returns to the initial state in. In this entire cycle, the processes of sliding outwards and inwards are symmetric, so a pair of symmetric alternating current peaks should be expected.

The model constructed here has the same structure and dimensions (71 mm×50 mm in surface) with the real device, and those two tribo-charged surfaces are assigned with a charge density of ±70 μC/m², respectively. The device is in open-circuit condition, which means no electron transfer between the two electrodes. When the two plates are in the fully aligned stacking position, there is no potential difference generated. When the top plate slides about half way out (with a displacement of 41 mm), there will be a 2950 V potential difference between the two electrodes; and this potential difference will increase to $1.03 \times 10^5$ V when the top plate just slides out of touching the bottom plate (with a displacement of 71 mm). The voltage keeps increasing when the displacement gets larger, even after the plates slide out of each other. This is because the voltage is the path-integral of the electric field along the displacement. On the other hand, the amounts of transferred charges between the two electrodes under these different displacements are also simulated through equating the potential of the electrodes at the short-circuit condition. The amount of transferred charges increases linearly with the displacement before the top plate slides out of the bottom plate (with the displacement smaller than 71 mm). Different from the trend of the voltage, the amount of transferred charges will saturate at the total amount of tribo-charges on one surface after the plates have fully slid out of each other, because there is no further charge separation here. So, the effective displacement region for generating electricity is between 0 mm and 71 mm, where the contact area of the two plates is changed during the relative sliding of the two plates.

The electrical output of the sliding-TENG was measured, with one plate guided by the linear motor in the direction parallel to the long-edge of the plates. The sliding displacement was 71 mm, which was the same with the length of the plate and thus covered the entire effective region for generating electricity. The sliding movement was in a symmetric acceleration-deceleration mode, with the acceleration rate of ±20 m/s². The open-circuit voltage ($V_{OC}$) was measured by an electrometer with very large input resistance. The electrode at the back of Nylon film was connected to the positive probe. When the plates in the TENG slid from the contact position to the separated position, the $V_{OC}$ jumped from 0 to ~1300 V, which reflects the induced potential difference between the two electrodes by the in-plane charge separation. At the separation position, the $V_{OC}$ decayed a little bit, due to the slow charge leakage through the electrometer. When the TENG slid back to the contact position, the $V_{OC}$ jumped back to 0. The density of the transferred charge (Δσ) was also measured at the short-circuit condition. Charges with a density of ~105 μC/m² transferred back and forth between the two electrodes, while the plates slid in and out. Since the plates got fully separated in each cycle, the transferred charge density should approximately equal to the triboelectric charge density on the polymeric surfaces. With these experimental results, the measured $V_{OC}$ is smaller than the simulated potential difference, which is possibly due to the limitation of the electrical measurement system to record such a high voltage and the imperfection from the ideal open-circuit condition. The transfer of the charges between the electrodes in the outer circuits produced an alternating-current output, with the peak short-circuit current density ($J_{SC}$) of 4.1 mA/m² at a maximum sliding velocity of 1.2 m/s. In this experimental embodiment, with such a power output converted from the sliding motion, hundreds of commercial light-emitting diodes (LEDs) were instantaneously driven by a single TENG device.

The TENG's effective output power to the loads depends on the match with the resistance of the load. When the resistance is below ~1 MΩ, the output current density and the voltage have little changes from the short-circuit condition: the current density remains at a value of $J_{SC}$ while the voltage stays close to 0. This is because the TENG has infinitely-large inner resistance. When the resistance goes beyond 1 MΩ, the current density will drop with the increase of the resistance; while the voltage on the load increases. Consequently, the instantaneous power density on the load remains close to 0 with the resistance below 1 MΩ, and reaches the maximum value of 0.42 W/m² at a resistance of ~50 MΩ. This is the maximum output power density on the device.

The output of the planar-sliding-driven TENG is directly determined by the parameters of the sliding motion—the displacement and the velocity, because the flow of electricity originates from the tribo-charge separation under sliding. As simulated, before the two plates fully slide out of each other (with a displacement smaller than 71 mm), the voltage increases monotonically with the displacement. Also, if there is a uniform tribo-charge distribution on the polymeric surface, the total amount of transferred charges will have a linear relationship with the displacement, which can be expressed in charge density as:

$$\frac{\Delta \sigma}{\sigma_0} = \frac{\Delta L}{L_0} \qquad (2)$$

where Δσ is the transferred charge density, $\sigma_0$ is the tribo-charge density on the polymeric surface, ΔL is the sliding displacement and $L_0$ is the length of the plate which is 71 mm. According to the definition of current density (J), it has the following relationship:

$$J = \frac{d\Delta\sigma}{dt} \quad (3)$$

where t is the time. Merging equation (2) into (3) results in $$J = \frac{\sigma_0}{L_0} \cdot \frac{d\Delta L}{dt} = \frac{\sigma_0}{L_0} v \quad (4)$$

where v is the instantaneous velocity of the sliding. So, the current density should be proportional to the instantaneous velocity at which the two plates are being separated.

A systematic study of these relationships between the electrical outputs ($V_{OC}$ and $J_{SC}$) and the sliding conditions was carried out experimentally. In the first group of experiments, the electrical outputs were measured under a series of 7 different sliding displacements from 11 mm to 71 mm, with an acceleration kept at 20 m/s$^2$. It was found that, the $V_{OC}$ increases with the displacement, which is in accordance with simulation results. The measured transferred charge density $\Delta\sigma$ displays a linear relationship with the displacement, which can be linearly fitted with the correlation coefficient of 0.981. As for the peak value of $J_{SC}$ which is in proportional to the maximum velocity $v_m$, it also has a positive correlation with the displacement. This is because $v_m$ has such a relationship with the displacement:

$$v_m = \sqrt{a\Delta L} \quad (5)$$

where a is the acceleration and $\Delta L$ is the total displacement (the displacement for each acceleration and deceleration process is $\Delta L/2$, respectively).

When the sliding displacement remains at a constant value of 71 mm, the maximum velocity of the sliding is solely determined by the acceleration. Thus, the acceleration was varied to investigate the velocity's influence on the output. It was found that $V_{OC}$ has very little increase with the rising acceleration, which is also consistent with the theoretical expectation that $V_{OC}$ is only determined by the displacement. However, the changing rate of the voltage will depend on the sliding velocity. The higher the velocity, the faster the voltage increases/decreases in sliding. As for the output current, the peak value of $J_{SC}$ gets larger at higher acceleration, because of the larger maximum velocity in sliding. However, the sliding velocity has no influence on the transferred charge density $\Delta\sigma$ under the constant displacement.

Because the essence in the working mechanism of the sliding-TENG is the cycled switching between the separation and full contact of the opposite tribo-charges, there should be little electricity generated in the following two cases: (1) If the sliding motion does not result in the change of the contact area between two plates, for example, if a smaller plate slides inside the perimeter of a larger plate at all time, then little output can be measured. This is because there is no polarization generated in this case. (2) If the two plates do not fully in tight contact with each other at the overlapping position, there is always a vertical gap distance between them, which results in two cases: the first is that little triboelectric charges are generated; the second case is that if there are triboelectric charges on the plates, the gap between them in the vertical direction quickly decays the strength of electrostatic interaction, resulting in a reduced output. When the vertical distance between the two plates of the TENG is gradually increased from 0 to 2 mm, the output voltage, current and transferred charges all quickly decay to zero.

The planar sliding mode TENG disclosed herein has several advantages, including: (1) This TENG design does not need a gap between the two plates. Thus it will be unnecessary to have elastic supporting components (such as springs) between the two plates to ensure the effective charge separation. This brings up a lot of convenience in packaging the TENG device; (2) there is no need for a large amount of mechanical energy input to trigger this TENG design, which can help to improve the energy harvesting efficiency. The mechanical energy only needs to overcome the work done by the sliding friction between the two plates. (3) This TENG design is simple in structure, easy in fabrication, compact in volume, stable in performance, cost-effective and robust. With these advantages, such in-plane charge-separation-based TENGs can harvest mechanical energies in the form of relative sliding that are supplied by many different working configurations, for example, the relative rotation of two contacting plates, the vibration of the piston, the rotation of the axis to its tube, and so on. Besides, those types of mechanical energy that can drive the relative sliding between two objects can also be harvested using this principle of in-plane charge-separation-based TENG, which can greatly expand the application of this type of TENG to scavenge mechanical energy from wind power, oceanic wave, human activities, and so on.

As shown in FIGS. 2A, 2B and 3A-3D, the first dielectric layer 214 can include a first grating of evenly spaced apart parallel ridges 216 and troughs 218. Similarly, the second member can include a second grating first grating of evenly spaced apart parallel ridges 226 and troughs 228. As can be seen in FIGS. 3A-3D, while the overall surface contact area density of this embodiment is essentially one half that of the embodiment shown in FIG. 1A-1D, the total sliding distance necessary for maximum charge transfer is limited to the width of a single ridge. Thus, depending on the width of the ridges (which can be microscale using lithographic techniques), this embodiment can generate its maximum current with an extremely small scale source of reciprocal motion (such as vibrations). These embodiments can be made using well known thin film application processes for applying layers to the substrates and standard lithographic techniques for etching the troughs.

Figure 4A:
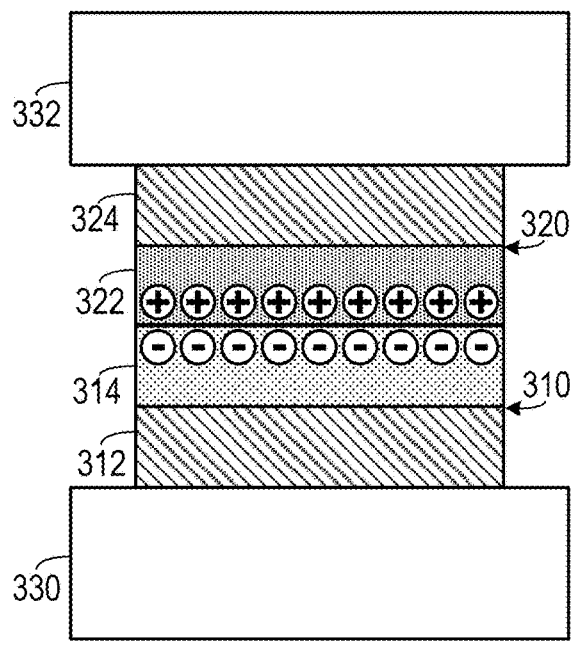
FIGS. 4A and 4B are side elevational view of triboelectric generating devices employing two dielectric layers.
Figure 4B:
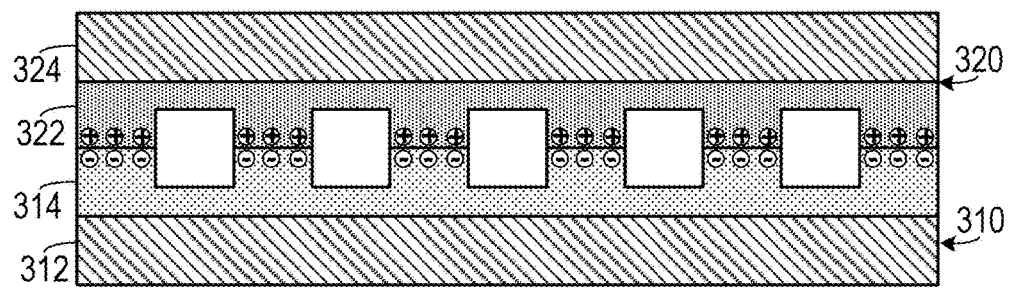

As shown in FIG. 4A, one embodiment includes: a first member 310 having a first electrode 312 mounted on a first rigid substrate 330 and a first dielectric layer 314 applied thereto, and a second member having a second electrode 324 mounted on a second rigid substrate 332 and a second dielectric layer 322 mounted thereto. As shown in FIG. 4B, a two dielectric layer embodiment can also include gratings formed in the first dielectric layer 314 and the second dielectric layer 322.

Introducing linear grating on the sliding surfaces enables the new principle to become an extremely efficient means for energy harvesting; and it is far superior to the previously demonstrated ones in total output charge, current frequency and efficiency. A linear grating with a uniform period is fabricated on both sliding surfaces. The rows of the grating units have the same size as intervals in between, with all rows being electrically connected at both ends by two buses. The grating patterns on both sliding surfaces are identical so that they can match well with each other when aligned. Although the grating design reduces the total contact area by half thus seemingly sacrifices half of the triboelectric charges, it increases the percentage of the mismatched area to 100% for a displacement of only a grating unit length rather than the entire length of the TENG so that it dramatically increases the transport efficiency of the induced charges. Induced free electrons can be pumped back and forth between electrodes for multiple times due to the grating structure, providing multi-folds of output charge compared to a non-grating TENG. Every row of the grating units can be considered as a reduced-sized TENG having a parallel connection with all other rows through buses. In contrast to a non-grating TENG that needs to be fully displaced in order to complete pumping of the induced charges for one time, the grating TENG only requires a displacement of a unit length to completely transport the induced charges, largely improving the energy conversion efficiency. With further displacement of another length of the unit, back flow of the induced charges can be realized. Therefore, for a one-way sliding process across the whole length of the TENG, the induced charges can be pumped for (2N−1) times in total, where N is the number of grating units. If we take into account that the contacting area decreases as the two surfaces slide apart, the following equation represents the total induced charges Q that the grating TENG can provide for a single sliding across the entire length of the TENG:

$$Q = Nq' + |-q' \times (N-1)| + q' \times (N-1) + \ldots + |-q'| + q' \quad (6)$$
$$= Nq' + 2q' \times \sum_{i=1}^{N-1} i$$
$$= (2q'N)N/2$$

where q' is the induced charges generated from a single grating unit for a displacement of the unit length.

The total maximum induced charges generated by a non-grating TENG can be equivalently expressed as 2q'N. Therefore, Eq. (6) indicates that the total induced charges linearly increase with the grating density. Experimental data from grating TENGs with more units further confirm the validity of the theoretical analysis.

Though the experimental data closely match the theoretical values for N≤4, slight deviation starts to appear if N further increases. The deviation may be attributed to two probable reasons. The first is non-ideal orientation mismatch. The two sliding surfaces are likely to have an angle of mismatch that is introduced by experimental operation. As the length of the grating units shrinks, the angle of mismatch will exert more substantial effect on the effective contact area between the two surfaces, leading to increasingly reduced output charge. This effect can be largely eliminated by more precise alignment during experiment operation. Secondly, assumptions made in the analytical theory may become imprecise for very fine grating units due to the edge effect of each unit. The assumption of infinite charged plane will no longer hold once the grating edges can dominantly affect the electric field distribution, leading to reduced quantity of induced charges. Further systematic investigation by both experiment and simulation is required to quantitatively understand this non-ideal effect. As experimentally observed, $V_{oc}$ is only weakly related to the number of grating units, though slight reduction can be observed. The reduction can also be attributed to the increasingly stronger effect from the mismatched angle. Besides, finer grating units will theoretically give a smaller $V_{oc}$, though this effect may be dominant only when the grating unit has a length approaching the PTFE's thickness. The advantages of the grating structure include not only the enhanced total transported charges but also improved output current. With constant sliding velocity, finer grating shortens the time to transport induced charges between the electrodes for one time, resulting in higher output current. However, the peak of $I_{sc}$ does not increase linearly with the number of units, which may result from non-uniform velocity during sliding process.

To demonstrate the capability of the new principle as a direct power source, a total of 80 commercial LED bulbs were utilized as operating load. They were divided into two groups, which were connected to a TENG with reversed polarity in order to clearly demonstrate the AC output without rectification. One substrate of the TENG was fixed on a breadboard where the LEDs were installed, while the other one was attached to human fingers. As the hand swept back and forth, the sliding was realized. It was noticed that faster sweeping generated higher current peaks as compared with those from slower sweeping. Due to the AC output, the two LED groups were alternately lighted up, as indicated by "ON" and "OFF" states.

Figure 5:
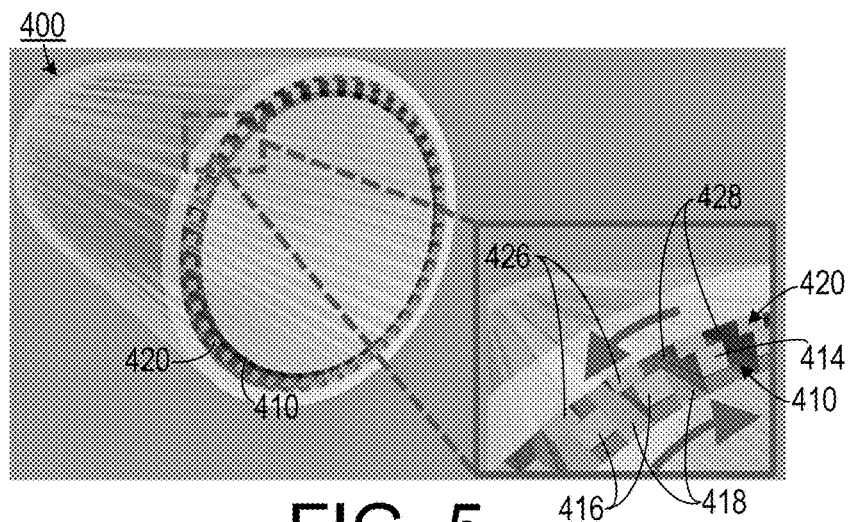
FIG. 5 is a perspective view of a cylindrical embodiment of a grooved triboelectric generator in which the groves run along a cylindrical axis.
Figure 6:
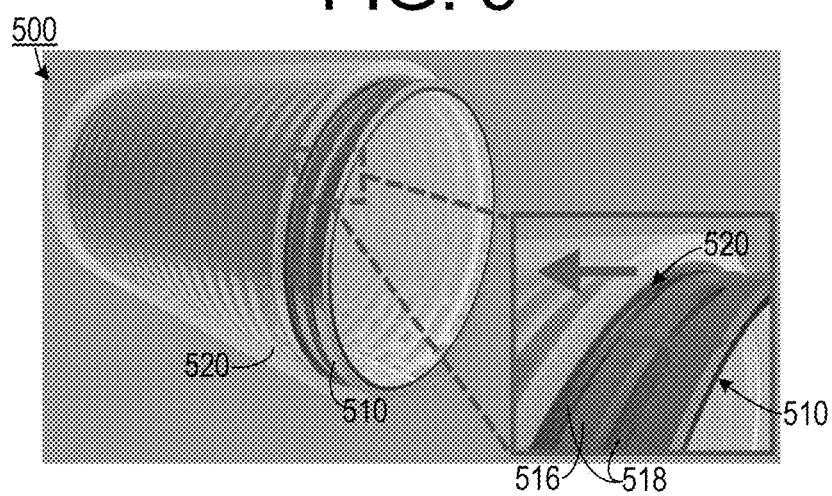
FIG. 6 is a perspective view of a cylindrical embodiment of a grooved triboelectric generator in which the groves run transverse to a cylindrical axis.
Figure 7:
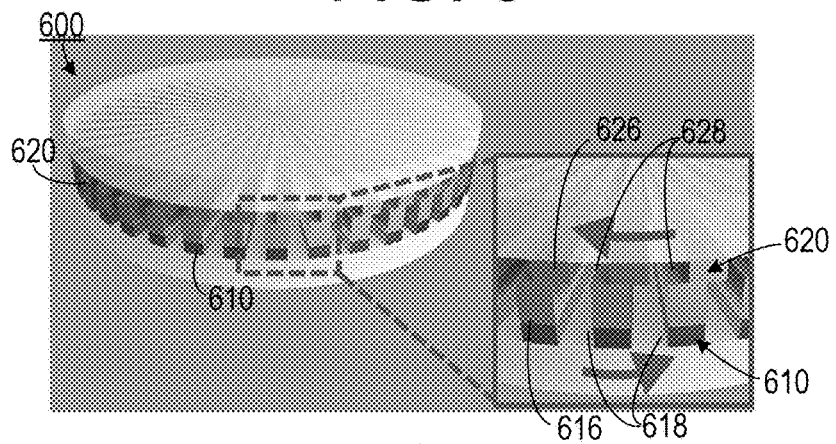
FIG. 7 is a perspective view of a disc-shaped embodiment of a grooved triboelectric generator in which the groves extend radially from a central axis.

Besides the planar design, other configurations include, concentric discs having relative rotation and coaxial tubes having either rotational motion or reciprocating piston motion. The principles demonstrated for the grating TENG can be applied to other configurations. For example, as shown in FIG. 5, in one embodiment of a TENG 400 the first member 410 and the second member 420 are cylindrical. The first dielectric layer 414 includes a first grating of evenly spaced apart parallel ridges 416 and troughs 418 and the second member 420 includes a second grating of parallel ridges 426 and troughs 428. All of the ridges and troughs extend parallel to the axis of the cylinder. Thus, when either the first member 410 or the second member 420 is rotated about the cylindrical axis (or both rotated so long as there is relative motion between them), the ridges of the second member 420 and the first member 410 will come in and out of contact. This embodiment is effective when it is desired to turn rotational motion into electricity. In the embodiment shown in FIG. 6, the ridges 516 and troughs 518 of the first grating and the second grating are disposed circumferentially about the cylinder and the sliding mechanism is configured to apply reciprocating motion along the cylindrical axis to either the first member 510 or the second member 520 (or both so long as there is relative motion between them), thereby converting the reciprocating motion into electricity. In the embodiment shown in FIG. 7, the ridges 616 and troughs 618 of the first grating and the second grating extend radially outwardly from a central axis of a disk. Electricity is generated when at least one of the first member 610 and the second member 620 is caused to rotate around the central axis of the disks (or both can be rotating so long as there is relative rotational motion between them).

Figure 8:
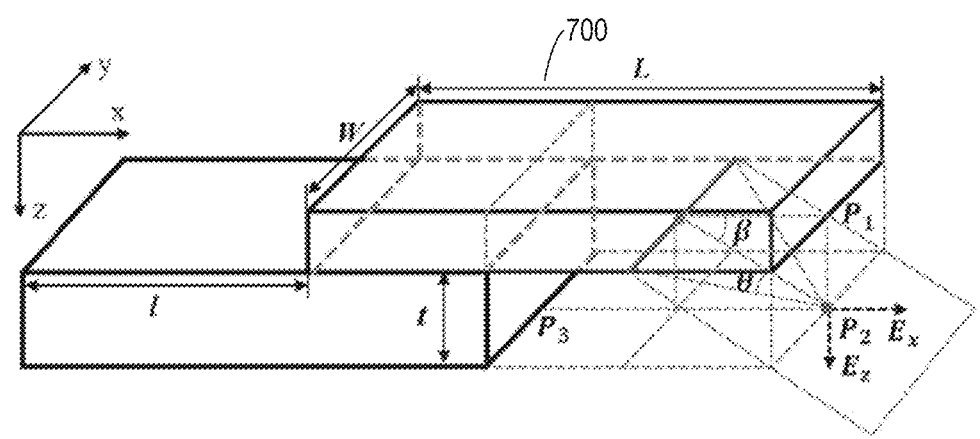
FIG. 8 is a schematic diagram showing dimensions of a triboelectric generator used in analysis thereof.

An analytical model for calculating the open-circuit voltage of a TENG 700 is now presented using the diagram shown in FIG. 8. For simplicity of the mathematical derivation, the analytical model is built based on the following assumptions:

(1) The two sliding surfaces of the TENG are infinitely large because the lateral dimension is much larger than the vertical thickness.

(2) The generated triboelectric charges, which are non-mobile and non-annihilative, are uniformly distributed on the two surfaces. This is an excellent approximation if the two materials are insulative. In a case that one side is metal, this approximation is made for easy derivation.

(3) Both the aluminum and the PTFE thin film can be simplified as planar surfaces which retain their shapes instead of having deformation when sliding laterally. Once the two surfaces contact with each other, triboelectric charges are created due to contact electrification. Based on assumption (2) and assumption (3), the lateral displacement l brings about uncompensated positive and negative triboelectric charges in the displaced areas on the upper surface and the lower surface, respectively.

If we define the electric potential of the copper electrode ($U_{Cu}$) to be zero, the open circuit voltage of the TENG is equal to the electric potential of the electrode ($U_{Al}$), that is, $$V_{OC} = U_{Al} - U_{Cu} = U_{Al} = U_{P_1} - U_{P_3} \tag{S1}$$

Also, the electric potential difference can be expressed as $$U_{P_1} - U_{P_3} = \int_{P_1}^{P_3} E \cdot dl_{1 \to 3} = \int_{P_1}^{P_2} E_{1 \to 2} \cdot dt + \int_{P_2}^{P_3} E_{2 \to 3} \cdot dl \tag{S2}$$

Meanwhile, given assumption (1) and (2), we can consider the upper surface as charged plate of infinity in size, so that the electric lines of force are perpendicular to the surface of the plate as well as the patch from $P_2$ to $P_3$. As a result $$\int_{P_2}^{P_3} E_{2 \to 3} \cdot dl = 0 \tag{S3}$$

and $$U_{Al} = \int_{P_1}^{P_2} E_{1 \to 2} \cdot dt \tag{S4}$$

In order to calculate the electric field strength $E_{1 \to 2}$ in the path from $P_1$ to $P_2$, let us consider an infinite, charged line in the displaced area on the upper surface. And the corresponding electric field strength $E_{sl}$ at $P_2$ can be quantitatively expressed as $$E_{sl} = \int_{-\theta}^{+\theta} \frac{\sigma}{4\pi\varepsilon_0} \cdot \frac{\cos\theta}{\sqrt{t^2 + l^2}} \cdot d\theta = \frac{\sigma}{2\pi\varepsilon_0} \cdot \frac{\sin\theta}{\sqrt{t^2 + l^2}} \tag{S5}$$

where $\varepsilon_0$ is the permittivity of vacuum, t is the thickness of the PTFE film, l is the displacement, and $\sigma$ is the line charge density $$\sigma = \frac{q}{WL} \tag{S6}$$

where q is the total triboelectric charges, W and L are the width and length of the two sliding surfaces, respectively. Meanwhile, in our case, compared with the PTFE's thickness, the charged line is considered to be infinitely long, thus, $$\theta = 90° \tag{S7}$$

Upon combination and simplification, $E_{sl}$ can be expressed as $$E_{sl} = \frac{q}{2\pi\varepsilon_0 WL\sqrt{t^2 + l^2}} \tag{S8}$$

However, only the component along Z axis of the electric filed strength $E_{sl}$ is parallel to the electric field, making the effective electric filed strength expressed as $$E_{\text{eff}} = E_{sl} \cdot \sin\beta \tag{S9}$$

$$\sin\beta = \frac{t}{\sqrt{t^2 + l^2}} \tag{S10}$$

Upon combination and simplification, $$E_{\text{eff}} = E_{sl} \cdot \sin\beta = \frac{q}{2\pi\varepsilon_0 WL} \cdot \frac{t}{(t^2 + l^2)} \tag{S11}$$

Thus, the total electric filed strength $E_{1 \to 2}$ generated at $P_2$ along the z-axis by the triboelectric charges on the entire displaced area of the upper surface can be calculated as $$E_{1 \to 2} = \int_0^l \frac{q}{2\pi\varepsilon_0 WL} \cdot \frac{t}{(t^2 + l^2)} dl = \frac{q}{2\pi\varepsilon_0 WL} \cdot \tan^{-1}\left(\frac{l}{t}\right) \tag{S12}$$

Submit the Equation (S12) into the Equation (S4)

$$U_{Al} = \int_0^l E_{1 \to 2} \cdot dt = \int_0^l \frac{q}{2\pi\varepsilon_0 WL} \cdot \tan^{-1}\left(\frac{l}{t}\right) dt \tag{S13}$$

Finally, the open-circuit voltage $V_{oc}$ between the two electrodes can be expressed as $$V_{oc} = U_{Al} = \frac{q}{2\pi\varepsilon_0 WL} \cdot \left[\frac{l}{2}\ln(t^2 + l^2) + t\tan^{-1}\left(\frac{l}{t}\right)\right] \tag{S14}$$

The energy conversion efficiency ($\eta$ %) can be estimated through the conversation of energy. According to the definition:

$$\eta \% \equiv \frac{E_{ele}}{E_{Mech}} \times 100\%$$

where $E_{ele}$ is the electrical energy generated in the half cycle of the displacement, and $E_{Mech}$ is the mechanical energy input. They can be estimated as follow.

The maximum electrical energy generated by the sliding TENG in a half-cycle, be estimated using the data of the TENG's output characteristic when driving external load. The highest power output is reached at the resistance of 80 MΩ, which will correspond to the maximum electric energy output ($E_{ele}$). It can be calculated according to the following equation:

$$E_{ele} = \int I^2 R dt$$

The curve of $I^2R$ vs. t (R=80 MΩ) can be derived from the corresponding I vs. t curve, and through the integration of one ($I^2R$) peak in a half-cycle, we can get:

$$E_{ele} = 0.145 \text{ mJ}.$$

In general, the mechanical energy input for driving the sliding TENG is converted into two parts: the electrostatic energy ($E_{es}$) of the two oppositely-charged plates at the fully displaced position, and the electrical energy ($E_{ele}$) the TENG generated in the sliding process.

As for the electrostatic energy $E_{es}$, it can be estimated as:

$$E_{es}=U_T\sigma_0 A+U_B(-\sigma_0)A=(U_T-U_B)\sigma_0 A=V_{OC}\sigma_0 A$$

where $U_T$ and $U_B$ are the potentials at the top plate and bottom plate, respectively; and A is the area of the plate, which is 35.5 cm$^2$. In this estimation, we assume each charged plane has a uniform potential, which is reasonable as shown in the simulated results of the potential distribution. From the electrical measurement of the TENG, $V_{OC}$ is ~1300 V and $\sigma_0$ is ~105 μC/m$^2$. Thus, we can get $$E_{es}=V_{OC}\sigma_0 A=1300\text{ V}\times 105\times 10^{-6}\times 35.5\times 10^{-4}\text{ C}=0.485\text{ mJ}$$

Thus, the mechanical energy input $E_{Mech}$ can be estimated to be:

$$E_{Mech}=E_{es}+E_{ele}=0.630\text{ mJ}$$

The other part of energy input is the heat dissipated during mechanical sliding, which is rather difficulty to estimate for the current design. If we ignore this component, the maximum energy conversion efficiency can be estimated as follows:

$$(\eta\ \%)\max \equiv \frac{E_{ele}}{E_{Mech}}\times 100\% = \frac{0.145\text{ mJ}}{0.630\text{ mJ}}\times 100\% = 23.0\%$$

While many different materials can be organized according to a triboelectric series, the following is one representative example of a triboelectric series:

Asbestos
Glass
Mica
Nylon
Lead
Silk
Aluminum
Steel
Wood
Lucite
Amber
Hard Rubber
Mylar
Nickel
Copper
Silver
Brass
Synthetic Rubber
Gold, Platinum
Sulfur
Acetate, Rayon
Polyester
Celluloid
Polystyrene
Orlon, Acrylic
Polyvinylidene chloride (Saran)
Polyurethane
Polyethylene
Polypropylene
Polyvinylchloride (Vinyl)
PTFE
Silicon
Teflon
Silicone Rubber Here we report a compact case-encapsulated triboelectric nanogenerator (cTENG) that targets reciprocating motions driven by either direct or inertia forces. The cTENG relies on electrode pairs that have fine-grating patterns on cylindrical sliding surfaces to generate alternating current. In an embodiment that operates at a sliding velocity of 1 m/s over a sliding distance of 3.8 cm, such a cTENG with an effective contact area of 90 cm$^2$ could generate an output charge of 12.7 μC in a single full slide, which corresponds to an average output DC current of as high as 0.35 mA. At the matched load of 140 kΩ, an average output power of 12.2 mW can be achieved. A cTENG of this type can be used to harness oscillating motion from sources such as human and water wave motion as an indication of its potential in portable self-powered electronics and power generation.

Figure 9A:
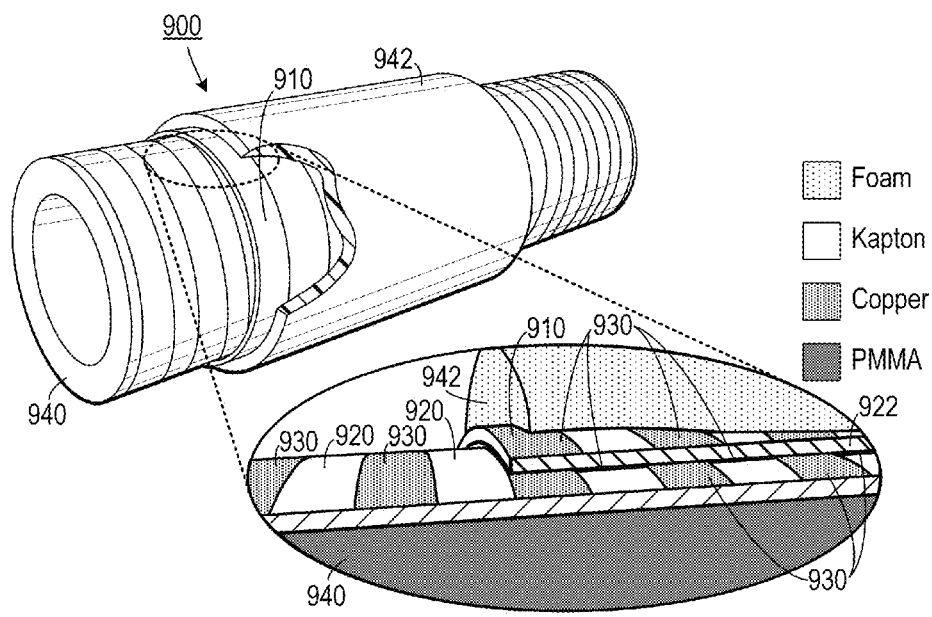
FIGS. 9A-9F show one embodiment of a case-encapsulated triboelectric nanogenerator.
Figure 9B:
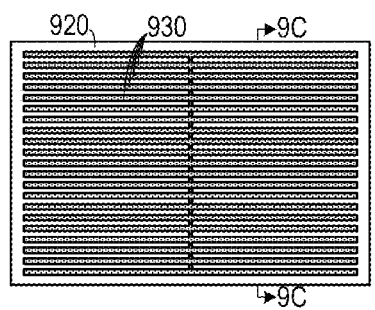
Figure 9C:
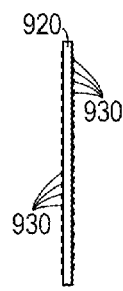
Figure 9F:
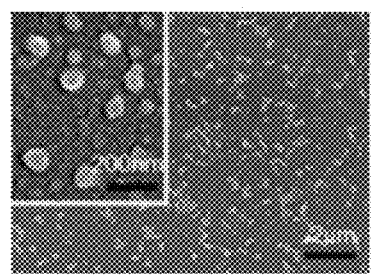
Figure 9E:
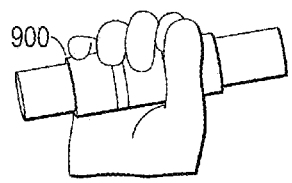
Figure 9D:
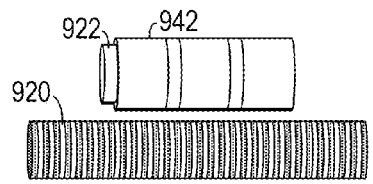

As shown in FIGS. 9A-9F, the structural configuration of one representative embodiment of a cTENG uses two concentric cylinders that can slide one against the other. The basic principle of the cTENG relies on sliding triboelectrification at the interface. The case wrap applied tightly around the outer cylinder 910 allows the two cylindrical structures to move in a coaxial 1-D motion relative to each other. Polyimide film (Kapton®) can be used as an electrification material for generating triboelectric charges and also, as the supporting substrate. Kapton film can be used as it possesses good electrification and tensile strength properties, leading to a high-performance in electricity generation and durability. On both sides of the Kapton film, copper stripes (which in one embodiment have a width of 2 mm) are deposited with a linear pitch of 4 mm. The electrode patterns on different sides exhibit a linear shift of half pitch so that they are complementary to each other. Two Kapton films 920 and 922 have the same electrode patterns formed a pair of contact surfaces. All copper stripes 930 on the two contact surfaces are connected by bus electrodes to form a common inner electrode (IE), while those on back surfaces of the Kapton films constituted an outer electrode (OE). Spherical polytetrafluoroethylene (PTFE) nanoparticles (as seen in FIG. 9F) are spread between the contact surfaces as a lubricant to reduce friction and to further improve energy conversion efficiency. The two prepared Kapton films 920 and 922 with electrodes are applied on the outer surface of a PMMA tube 940 and the inner surface of a foam tube 942, respectively. A fully assembled cTENG is shown in FIG. 9E.

In one embodiment, the copper strips can be disposed circumferentially about the Kapton films. In another embodiment, the copper strips can be disposed helically about the Kapton films.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An electricity generator, comprising:
    (a) a first elongated member extending along a first direction, including:
        (i) a first dielectric layer including a first material that has a first rating on a triboelectric series, the first dielectric layer including an inner surface and an opposite outer surface;
        (ii) a first plurality of outer conductive strips disposed around the outer surface of the first dielectric layer transversely to the first direction and evenly spaced apart from each other, the first plurality of outer conductive strips each including a second material that has a second rating on the triboelectric series that is different from the first rating, a first outer bus electrode electrically coupling each of the first plurality of outer conductive strips;

(iii) a first plurality of inner conductive strips disposed around the inner surface of the first dielectric layer transversely to the first direction and evenly spaced apart from each other, the first plurality of inner conductive strips each including the second material, the first plurality of inner conductive strips offset from first plurality of outer conductive strips so that each of the first plurality of inner conductive strips are disposed opposite from a space between successive ones of the first plurality of outer conductive strips, a first inner bus electrode electrically coupling each of the first plurality of inner conductive strips; and (b) a second elongated member extending along the first direction and disposed about the first elongated member, including:

(i) a second dielectric layer including the first material, the second dielectric layer including an inner surface and an opposite outer surface, the inner surface of the second dielectric layer being in contact with the outer surface of the first dielectric layer; and (ii) a second plurality of outer conductive strips disposed around the outer surface of the second dielectric layer transversely to the first direction and evenly spaced apart from each other, the second plurality of outer conductive strips each including the second material, a second outer bus electrode electrically coupling each of the second plurality of outer conductive strips; and (iii) a second plurality of inner conductive strips disposed around the inner surface of the second dielectric layer transversely to the first direction and evenly spaced apart from each other, the second plurality of inner conductive strips each including the second material, the second plurality of inner conductive strips offset from second plurality of outer conductive strips so that each of the second plurality of inner conductive strips are disposed opposite from a space between successive ones of the second plurality of outer conductive strips, a second inner bus electrode electrically coupling each of the second plurality of inner conductive strips, wherein the first inner bus electrode is electrically coupled to the second inner bus electrode and wherein the first outer bus electrode is electrically coupled to the second outer bus electrode, and wherein lateral relative motion between the first elongated member and the second elongated member along the first direction results in an electric potential imbalance between inner conductive strips and the outer conductive strips.

2. The electricity generator of claim 1, wherein the plurality of first conductive strips are disposed about both in exterior surface of the first dielectric layer and an interior surface of the first dielectric layer.

3. The electricity generator of claim 1, wherein the plurality of second conductive strips are disposed about both in exterior surface of the first dielectric layer and an interior surface of the second dielectric layer.

4. The electricity generator of claim 1, wherein the first material comprises a polyimide film.

5. The electricity generator of claim 1, wherein the second material comprises a copper.

6. The electricity generator of claim 1, further comprising a foam layer disposed about the second elongated member to provide support thereto.

7. The electricity generator of claim 1, further comprising a support elongated member about which the first elongated member is disposed that provides support thereto.

8. The electricity generator of claim 1, wherein the first elongated member is cylindrical.

9. The electricity generator of claim 1, wherein the second elongated member is cylindrical.

10. The electricity generator of claim 1, further comprising nanoparticles applied to a surface of the first dielectric layer.

11. The electricity generator of claim 1, further comprising nanoparticles applied to a surface of the second dielectric layer.

* * * * *